Nov. 28, 1967   R. O. MORK   3,355,028
PORTABLE BICYCLE STAND
Filed Oct. 14, 1965
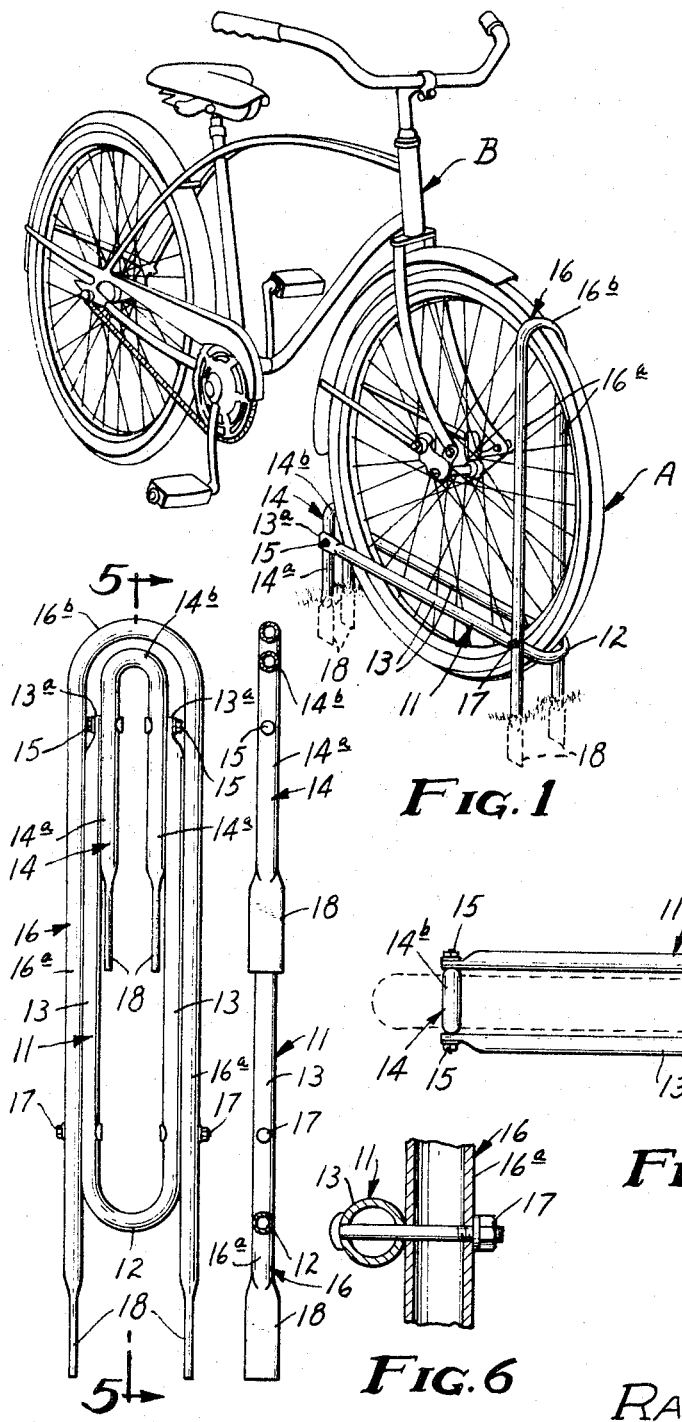
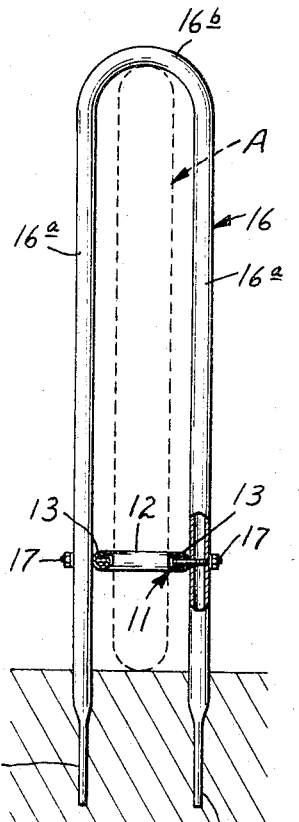
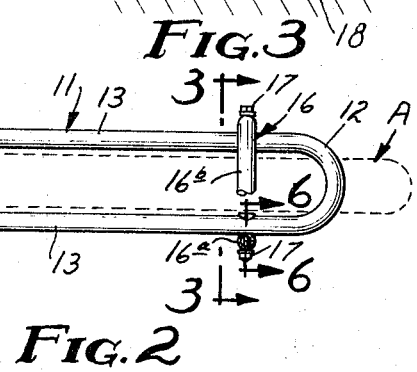
FIG. 1
FIG. 2
FIG. 3
FIG. 4   FIG. 5
FIG. 6
INVENTOR.
RAYMOND O. MORK
BY
Merchant, Merchant & Gould
ATTORNEYS

United States Patent Office 3,355,028
Patented Nov. 28, 1967

3,355,028
PORTABLE BICYCLE STAND
Raymond O. Mork, 712 Bristol St.,
Worthington, Minn. 56187
Filed Oct. 14, 1965, Ser. No. 495,820
4 Claims. (Cl. 211—21)

ABSTRACT OF THE DISCLOSURE

A portable, collapsible and ground penetrating apparatus, for supporting a bicycle by its front wheel in upright position, when in use position; but collapsible to a flat, compact non-use position for storage and/or portability.

---

My invention relates generally to bicycle stands, and has for its primary object the provision of a device of this character which is portable and collapsible.

More specifically to the above, the primary object of my invention is the provision of a bicycle stand which may be collapsed into a minimum of space for shipment and storage, and which may be placed into an operative position and inserted into the ground for use with a minimum of skill and effort.

A further object of my invention is the provision of a device of the class above described which may be manufactured from readily available commercial metallic stock at a relatively low cost and which is extremely light in weight, but rugged and durable in construction.

A still further object of my invention is the provision of a device of the class above described which is extremely compact even in its operative position, and not unseemly in appearance.

The above and still further objects of my invention will become apparent from the following detailed specification, appended claims, and attached drawings.

Referring to the drawings wherein like characters indicate like parts throughout the several views:

FIG. 1 is a view in perspective of my novel stand in operative position with a bicycle wheel supported therein;

FIG. 2 is an enlarged view in top plan of the structure of FIG. 1, portions thereof being broken away and shown in section;

FIG. 3 is a view in vertical section taken on the line 3—3 of FIG. 2;

FIG. 4 is an elevational view of my novel structure in a collapsed position;

FIG. 5 is a view in vertical section taken along the line 5—5 of FIG. 4: and

FIG. 6 is an enlarged sectional view taken along the line 6—6 of FIG. 2.

Referring with greater particularity to the drawings, the numeral 11 indicates in its entirety a U-shaped frame member, which, when in an operative position, is horizontally disposed with its closed end 12 limiting forward movements of the wheel A of a bicycle B received between the arms 13 thereof.

As shown, a relatively short U-shaped leg means 14 is pivotally secured, as at 15, between the flattened rear end portions 13a of the arms 13 for pivotal movements from the operative position of FIG. 1 wherein the leg elements 14a are normal to the plane of the arms 13, and the closed upper end 14b limits rearward movements of a bicycle wheel A received between the arms 13, to the collapsed position of FIGS. 4 and 5, wherein said leg means 14 is coplanar with horizontal frame member 11.

A relatively long U-shaped leg means, identified in its entirety by the numeral 16 and having leg elements 16a and closed end 16b, is shown as straddling the horizontal frame member 13 adjacent to the closed forward end 12 thereof. Pivotal movement is imparted to the relatively long leg means 16 by means of aligned pivot pins 17 whereby said leg means 16 may be readily moved from its operative position of FIG. 1, wherein the leg elements 16a thereof are normal to the plane of the horizontal frame member 13, to the inoperative position of FIGS. 4 and 5, wherein both the horizontal frame member 13 and relatively short leg means 14 are not only coplanar therewith, but entirely received therewithin. In such position, it should be obvious that my novel stand is ideally suited for storage and shipment.

As shown particularly in FIGS. 1, 3, and 4, the lower free ends of the leg members 14a, 16a of the relatively long and relatively short leg means 16, 14, respectively are flattened or otherwise pointed as at 18. Such flattened ends facilitate insertion of the leg members 14a, 16a into the ground, and thus insure that leg means 14, 16 maintain their vertical operative positions of FIG. 1.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:
1. A collapsible-portable bicycle stand comprising:
   (a) a generally horizontal U-shaped frame member, opposite arms of which are adapted to receive therebetween a bicycle wheel, the closed end thereof limiting movements of said wheel in one direction,
   (b) a relatively short leg element pivotally secured to one of said arms adjacent the other end of said horizontal frame member for pivotal movements from an upstanding operative position to a collapsed position coplanar with said frame member,
   (c) means carried by said realtively short leg element limiting movement of a wheel received between said arms in a direction away from said closed end,
   (d) a relatively long leg element pivotally secured to one of said arms adjacent said closed end of said frame member for movements from an upstanding operative position to an inoperative collapsed position coplanar with said horizontal frame member and with said short leg element,
   (e) said relatively long leg element projecting upwardly in closely spaced relation to one side of a wheel received between said arms and limiting lateral movement of said wheel in one direction, and
   (f) means carried by the upper end of said relatively long leg element and limiting lateral movements of a wheel received between said arms in the opposite direction.

2. A collapsible-portable bicycle stand comprising:
   (a) a rearwardly opening horizontally disposed U-shaped frame member, the opposite arms of which are adapted to receive therebetween the front wheel of a bicycle with the closed forward end thereof limiting movements of such a wheel in a forward direction,
   (b) a relatively short U-shaped rear leg means,
   (c) means pivotally securing the intermediate portion of the opposed legs of said relatively short leg means one each to one of said arms adjacent the rear end thereof for movements from an operative position wherein the free ends of the legs thereof are disposed generally normal to said horizontal frame member with the closed end limiting movements of a wheel received between said arms in a rear direction to a collapsed position coplanar with said arms, (d) a relatively long U-shaped leg means having opposed legs in a closed end, (e) one each of the legs of said relatively long U-shaped leg means having an intermediate portion pivotally secured to one of the arms of said horizontal frame member adjacent the closed end thereof for movements from an upstanding operative position wherein the opposed legs thereof project upwardly in closely spaced relation to opposite sides of a bicycle wheel received between the arms of said horizontal frame member to a collapsed position coplanar with said horizontal frame member and said U-shaped relatively short leg means, (f) said closed end of said relatively long U-shaped leg means limiting upward and forward movements of a bicycle wheel received between the opposed legs thereof.

3. The structure defined in claim 2 in which (a) the leg elements of said relatively short leg means are pivotally secured between the arms of said horizontal frame member, and in which (b) the leg elements of said relatively long leg means are pivotally secured to said arms laterally outwardly thereof, (c) said relatively short leg means and said horizontal frame member being totally received within said relatively long leg means when in their said collapsed coplanar positions.

4. The structure defined in claim 2 in which said frame member and said leg means are formed from tubular metallic stock, the free end portions of said leg means being flattened to facilitate insertion into the ground.

References Cited

UNITED STATES PATENTS

| 598,547 | 2/1898 | White | 211—21 |
| 2,719,632 | 10/1955 | Sill | 211—22 |
| 3,116,836 | 1/1964 | McCauley | 211—21 |

FOREIGN PATENTS

| 25,607 | 10/1897 | Great Britain. |
| 281,315 | 6/1952 | Switzerland. |

ROY D. FRAZIER, *Primary Examiner.*

K. J. WINGERT, *Assistant Examiner.*